Patented Apr. 16, 1940

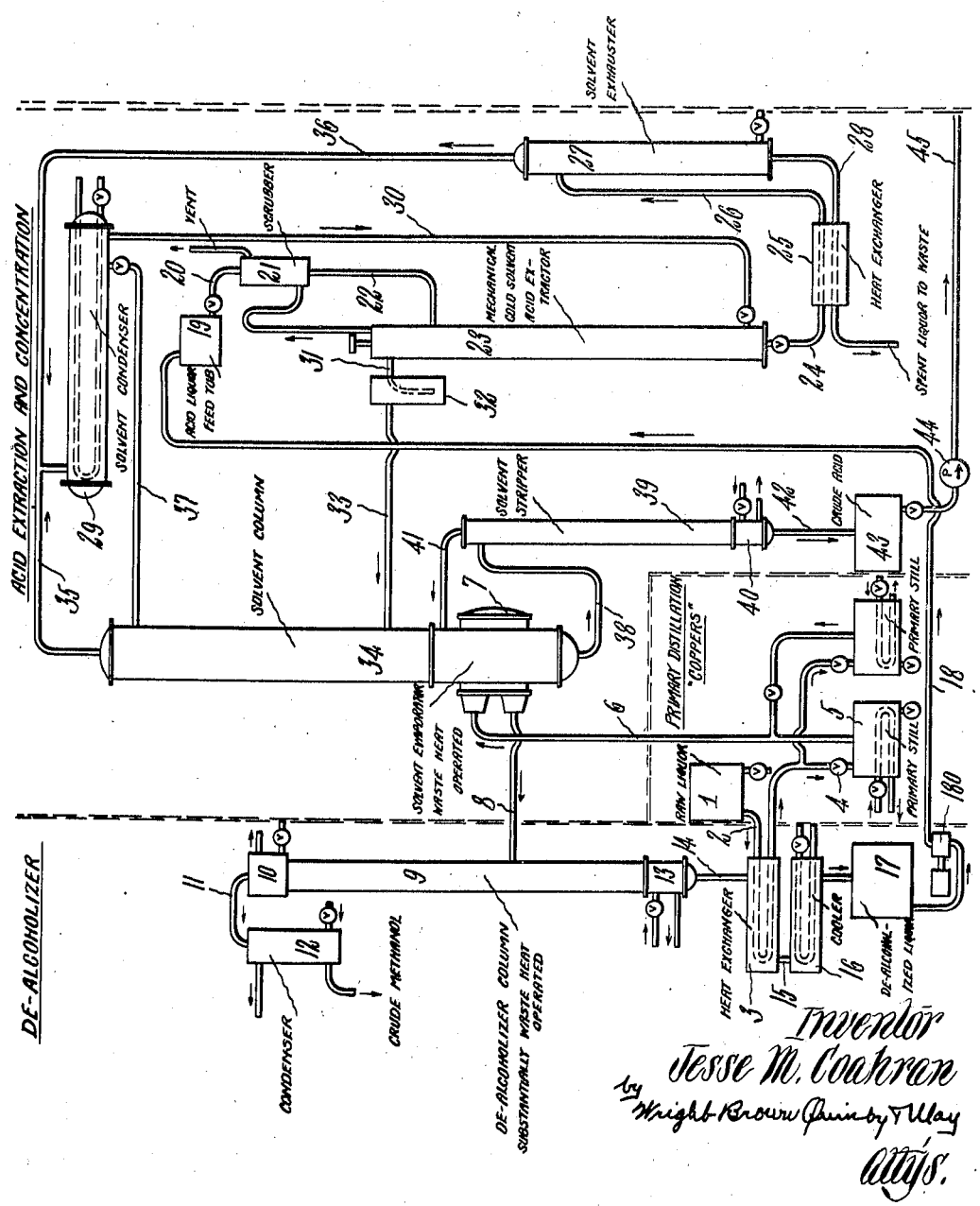

2,197,069

UNITED STATES PATENT OFFICE 2,197,069

METHOD OF SEPARATION OF MATERIALS

Jesse M. Coahran, Smethport, Pa.

Application June 29, 1935, Serial No. 29,051

2 Claims. (Cl. 202—55)

This invention relates to the separation of materials, and more particularly where distillation is an important part of the process, but where solvent extraction, decantation, and the like, may also be employed. Primarily this invention is concerned with the distillation portions of the process and with modifications of the process in order to reduce the consumption of heat which will commonly be represented by steam costs.

While this invention has been developed more particularly with relation to the separation, recovery and refinement of certain constituents of pyroligneous acid liquor obtained from the destructive distillation of wood or the like, in many of its phases it is of more general application, and while it will be described with particular reference to this particular purpose, it should not, except when specifically so stated in the appended claims, be held restricted thereto.

For a more complete understanding of this invention, reference may be had to the accompanying flow sheet showing an embodiment of the method and apparatus of this invention.

In the recovery of crude acetic acid by solvent extraction from pyroligneous acid liquor resulting from the destructive distillation of wood and similar materials, the customary steps in the process are:

(1) Cold settling and continuous decantation in raw liquor tubs to remove heavy insoluble tar, the products of this step being settled raw liquor and settled tar;

(2) A simple primary distillation, usually from steam heated copper stills and tar stills, followed by condensation, to remove soluble tars. The products of this step are "boiled liquor" and "boiled tar";

(3) Preheating of the boiled liquor followed by fractional distillation in a continuous steam heated dealcoholizer column for the removal of crude methanol. The products of this step are crude methanol and dealcoholized boiled liquor;

(4) Cold continuous countercurrent solvent extraction of the dealcoholized liquor in an extractor for the recovery of the acetic acid;

(5) Continuous fractional distillation by steam heat of the solvent and acid mixture in a solvent column to separate substantially acid-free solvent from the crude acetic acid;

(6) Heating by an open steam jet in an exhauster column of the extracted liquor to recover dissolved solvent.

In such a process with steam pressure in the steam lines at 125 pounds gage, and steam pressure in the apparatus at 25 pounds gage, including radiation losses, etc., the pounds of steam required per cord of 52 inch wood for these various operations or steps are as follows: Step 1—0; step 2—1866; step 3—329; step 4—0; step 5—1030; step 6—175.

Since steam costs constitute a very large proportion of the operating costs, reduction in steam consumption is most desirable, provided it can be accomplished without sacrifices in quality or quantity of products, and without incurring additional operating costs and delays for the cleaning of apparatus, and without excessive additional first costs for apparatus.

If it be attempted to completely or partially eliminate step 2 by preheating the settled or whole raw liquor and feeding it directly into the dealcoholizer column, the crude methanol recovered is very impure and involves greater difficulty and costs in refining. Tht dealcoholized liquor obtained contains large amounts of tarry materials, which appear in the crude acid obtained from the extraction and make refining more difficult and expensive. The dealcoholizer equipment is subject to excessive fouling, requiring frequent expensive shut-downs for cleaning.

If it be attempted to retain step 2 but to feed all the vapors from the primary stills of this step directly into the dealcoholizer column without intermediate condensation, this would result in the elimination of the condensers for these vapors and the cost of supplying condenser water. It would also reduce the steam required for the dealcoholizer column operation by nearly 80%, by furnishing in the liquor vapors all heat required to operate the upper part of the dealcoholizer column. However, this would increase by many times the volume of the vapors required to be handled in the dealcoholizer column and hence it would be necessary to increase the cross sectional area and thus the weight and the cost of the upper part of this column very considerably. Likewise the reflux condensers at the top of this column would have to be of a very much increased capacity and would use approximately as much water as the primary still condensers which would be eliminated. This modification, therefore, of the process hereinbefore outlined is not economically feasible.

In accordance with the method of this invention, however, the vapors from the primary still of step 2 are first partially condensed and the heat employed to advantage in the solvent column of step 5 to separate out solvent, and the mixture of vapors and condensate is then introduced into the dealcoholizer column. This method reduces the steam consumption for dealcoholization (step 3) by about 80%, and also reduces the steam consumption required for solvent distillation (step 5) by about 90%, this amounting in all to a reduction of about 36% in the total steam required for all of the steps hereinbefore enumerated, and in this process also all difficulties and disadvantages encountered in the two other plans for steam saving hereinbefore described are eliminated.

The new method in so far as this portion of the process is concerned consists essentially in:

*First*, so placing a properly designed solvent evaporator in the solvent distillating system that the boiling temperature of the solvent-acid mixture from which solvent is to be evaporated is substantially lower than the temperature of the liquor vapors produced in the primary stills of step 2.

*Second*, passing all or any portion of the liquor vapors from the step 2 distillation through the heating medium space in this evaporator, where about ⅔ to ¾ of the latent heat of vaporization of the liquor vapors (the amount depending on operating conditions) will be utilized in the evaporation of acid solvent, and a corresponding amount of the liquor vapors condensed to hot "boiled liquor". About 90% of the heat required for solvent distillation is furnished in this way from a source otherwise ordinarily wasted.

*Third*, passing the remaining ¼ to ⅓ of the volume of the original liquor vapors, together with the hot condensate, directly into the dealcoholizer column of step 3 where these uncondensed vapors supply ample heat to operate the upper part of this column, furnish vapors for reflux, heat for radiation losses, etc., thus decreasing by an amount of about 80% the steam required to operate the dealcoholizer column (step 3). On account of the great reduction of the volume of liquor vapors by condensation in the solvent evaporator, the upper part of the dealcoholizer column does not need to be larger than now ordinarily used, and since vapors to operate the upper part of the column do not pass through the lower part of the column as is now the case, this lower column section can be made much smaller than is now the practice, thus saving on first cost and maintenance and cleaning costs.

This method of operation is applicable only when the boiling temperature of the mixture of solvent and extracted chemical is substantially lower than the temperature of the liquor vapors from the stills of step 2.

Pyroligneous acid liquors ordinarily boil at about 207° to 210° F. When the extraction solvent used is ethyl ether, the boiling temperature of the mixture of solvent and extracted chemicals remains relatively low until most of the solvent has been evaporated, e. g.

| When the mixture is— | The boiling temperature is— |
|---|---|
| 50% ether | 104 deg. F. |
| 40% ether | 111 deg. F. |
| 25% ether | 127 deg. F. |
| 14% ether | 150 deg. F. |
| 11% ether | 169 deg. F. |
| 7% ether | 180 deg. F. |

Since ether-acid mixtures coming to the evaporator will usually contain more than 95% ether, it is evident that the temperature differences are such that over 90% of the ether can be readily evaporated by heat from the liquor vapors in a properly designed evaporator of reasonable proportions.

Referring to the flow diagram showing the improved operating methods, the operation is as follows: Settled raw liquor (or whole raw liquor if preferred) flows continuously by gravity from the storage vessels 1 in the section of the sheet marked "Primary Distillation," by way of the pipe 2 through the heat exchanger 3 where it is preheated by hot dealcoholizer liquor, then through feed pipes and control valves 4 to the primary stills 5. Liquor vapors from these stills 5 pass through lines 6 to the solvent evaporator 7 where their latent heat is employed in indirect heat exchange to evaporate solvent from the solvent-acid mixture, or solution, thereby condensing ⅔ to ¾ of the liquor vapors and at the same time removing most of the solvent from the solvent acid solution. The remaining liquor vapors, together with the hot condensate, pass through the line 8 into the central portion of the dealcoholizer column 9. These hot vapors passing up through this column are fractionated, partly condensed and refluxed by the dephlegmator 10 and crude methanol vapors pass on through the line 11 to the methanol condenser 12 and thence to the methanol storage. This method of separating out the methanol is fully described in the Coahran United States Patent No. 1,784,270.

Hot condensate flowing down through the dealcoholizer column 9 is met and heated by a relatively small amount of vapors from the steam heated evaporator 13 at the bottom of the column, thus driving off from the down-flowing liquor any remaining methanol it may contain.

Hot dealcoholized liquor flowing from the bottom of the evaporator 13 through the line 14 passes through the heat exchanger 3, thereby preheating the raw liquor being fed from the storage vessels 1 to the primary stills 5. Dealcoholized liquor then flows through the line 15 to the cooler 16, and thence to the dealcoholized liquor storage vessel 17, from which it is pumped through the line 18 by the pump 180 to the gravity feed tub 19, and thence by the valve regulated flow line 20 through the vent gas scrubber 21, where it dissolves solvent from the non-condensable vent gases (see Coahran United States Patent No. 1,680,452). Liquor flows from the scrubber 21 through the line 22 into the upper part of the countercurrent extractor 23, and down through this extractor where it gives up its acid to the up-flowing solvent (see Coahran United States Patents No. 1,845,128 and No. 1,870,834) thence through the line 24, to the heat exchanger 25, and on through the line 26 to the exhauster column 27 for the recovery of dissolved solvent, and then out through the line 28 to the heat exchanger 25 and then to waste.

Liquid solvent flows from the solvent condenser 29 through the line 30 into the countercurrent extrator 23 near the bottom and passes upward in contact with down-flowing liquor from which it picks up acid. Acid-laden solvent overflows from the top of the extractor through the line 31 into a water trap 32 and on through the line 33 into the solvent fractionating column 34 at a point above the solvent evaporator 7 (or directly into the evaporator depending on equipment design, operating conditions, etc.). In either case most of the solvent is vaporized in this apparatus by heat from the liquor vapors rising from the stills 5. Solvent vapors pass up within the solvent fractionating column 34, out through the line 35 to the solvent condenser 29 from which the solvent is recirculated. This condenser 29 also receives through the line 36 solvent vapors recovered from the extracted liquor by the exhauster column 27. Solvent reflux for the solvent column 34 is also furnished by the solvent condenser 29 through the valve regulated line 37.

Acid from which most of the solvent has been evaporated passes from the solvent column 34 through the line 38 to the top of a small stripper column 39 in which the last traces of solvent are driven from the acid by hot vapors from the steam operated heater 40. Solvent vapors from the top of the column 39 pass through the line 41 to the vapor space of the evaporator 7 or directly into the base of the solvent column 34. Solvent-free crude acid passes from the bottom of the heater 40 through the line 42 to the crude acid storage 43. Crude acid may be withdrawn from the storage tank for refining as desired, as through the pump 44 and the pipe 45.

From the foregoing description of the improved methods and certain apparatus by which these methods may be carried out, it should be evident to those skilled in the art that various changes and modifications might be made without departing from the spirit or scope of this invention as defined by the appended claims.

I claim:
1. The process which comprises distilling pyroligneous acid liquor, and removing the distillate, leaving soluble tar behind, partly condensing the distillate to substantially reduce its volume but leaving sufficient in vapor phase to drive off methanol therefrom in a subsequent fractional distillation independent of said first mentioned distillation by the latent heat of the vapor phase, and then subjecting said distillate to such independent fractional distillation and thereby removing the methanol therefrom.

2. The process which comprises distilling pyroligneous acid liquor and removing the distillate leaving soluble tar behind, passing the distillate in indirect heat exchange relation to a solution of acetic acid to remove solvent therefrom, said solution having been produced as hereinafter recited, whereby the said distillate is partly condensed and is partly vapor and its volume is substantially reduced, subjecting said partly condensed distillate to a fractional distillation during which the latent heat of its vapor portion drives off methanol therefrom, and subjecting the methanol free material so derived to cold extraction with a volatile acetic acid solvent to produce the solution hereinbefore recited.

JESSE M. COAHRAN.